O. A. J. R. LIPPERT-BRUENAUER.
ANNULAR BALL BEARING.
APPLICATION FILED JULY 12, 1917.

1,310,423.

Patented July 22, 1919.

Inventor:
Otto A. J. R. Lippert-Bruenauer,
By Dyrenforth, Lee, Chritton and Wiles
Attys.

UNITED STATES PATENT OFFICE.

OTTO A. J. R. LIPPERT-BRUENAUER, OF CHICAGO, ILLINOIS, ASSIGNOR TO U. S. BALL BEARING MANUFACTURING COMPANY, OF CHICAGO, ILLINOIS, A CORPORATION OF ILLINOIS.

ANNULAR BALL-BEARING.

1,310,423.  Specification of Letters Patent.  Patented July 22, 1919.

Application filed July 12, 1917. Serial No. 180,098.

*To all whom it may concern:*

Be it known that I, OTTO A. J. R. LIPPERT-BRUENAUER, a citizen of the United States, residing at Chicago, in the county of Cook and State of Illinois, have invented a new and useful Improvement in Annular Ball-Bearings, of which the following is a specification.

My invention relates to improvements in ball bearings, more particularly that type of self-contained ball bearing comprising inner and outer race members held in proper spaced relationship and locked together to form a unitary structure by means of a plurality of balls operating between the radially opposed faces of the raceways.

Figure 1:
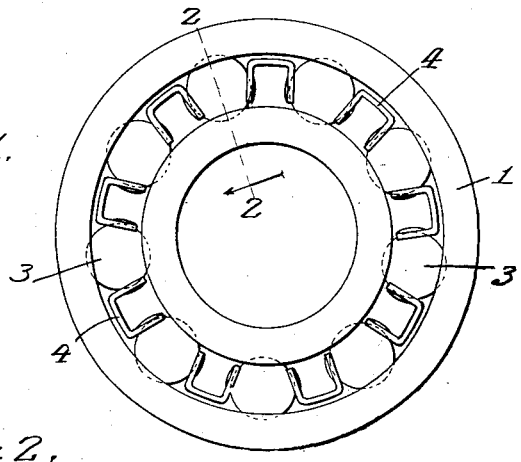
Figure 2:
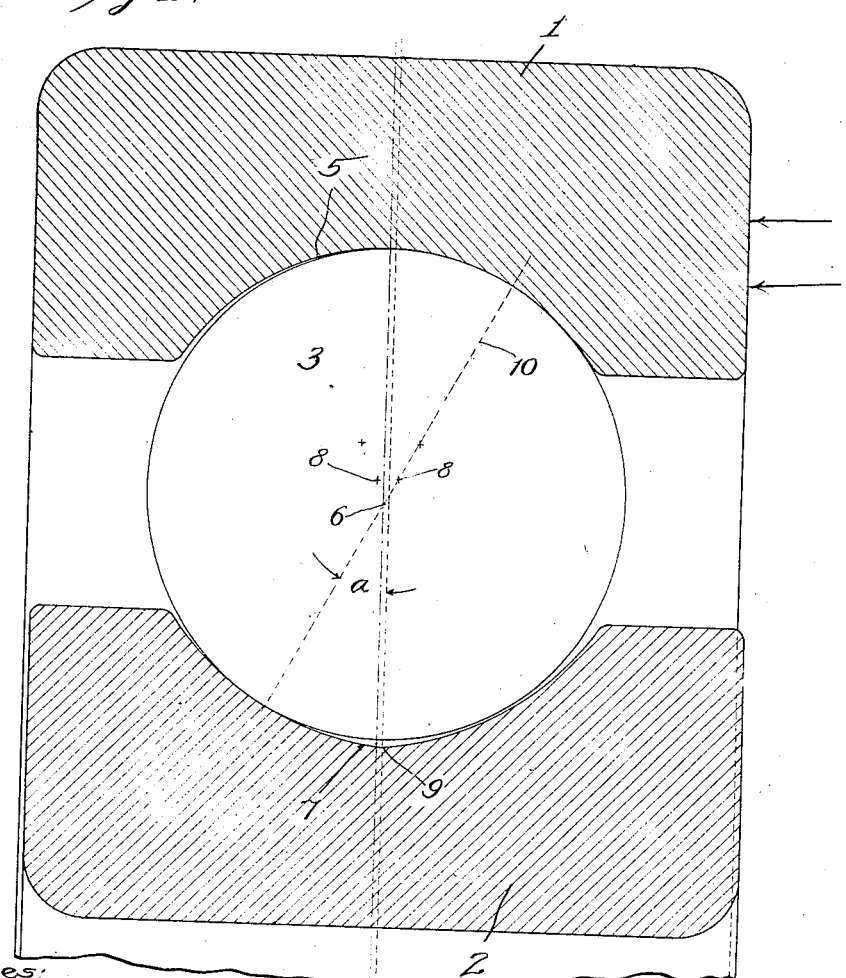

My invention will be fully understood from the following description of a specific embodiment thereof taken in connection with the accompanying drawings, in which:

Figure 1 is a side elevation of a ball bearing constructed in accordance with the invention, and Fig. 2 is a very much enlarged section, taken on the line 2—2, of Fig. 1.

Referring more particularly to the drawings, the numeral 1 designates an outer raceway member and the numeral 2 an inner raceway member, each of which is formed with a raceway groove as will later appear designed for the mounting of a plurality of bearing balls designated 3, these balls being preferably held apart by spacing devices 4.

The raceway groove in the outer race member 1 is preferably of circular cross-section and of a radius very slightly exceeding the radius of the coöperating ball 3, as illustrated at 5 in the drawing. The center of curvature of the raceway 5 with respect to the transverse plane on which the section 2 is taken is indicated by the point 6 in Fig. 2.

The raceway in the inner race-member 2 is designated 7 and its curvature in the plane on which the section Fig. 2 is taken is of a compound nature, being made up of two arcs struck from the points 8, 8, the two arcs intersecting at 9, thus producing a curved configuration, producing in effect a curvature which at the central portion only is greater than that of the ball, so that the ball clears the surface of the raceway at the bottom thereof.

It is the particular object of my invention to provide a ball bearing adapted for use in locations in which there is a considerable radial load combined with a reasonable but not excessive thrust load. Where radial loads only are met with, my improved bearing operates as a three-point bearing, that is, each bearing ball 3 contacts with the outer raceway groove 5 at its center and with the inner raceway groove 7 at two points equally spaced from the intersection point 9. This manner of operation is well understood and has not been specifically illustrated in the drawings. Where a thrust load is applied to the bearing as, for example, in the direction indicated by the arrows in Fig. 2, the two race-members will be slightly displaced as shown in that figure, and under such conditions the ball 3 contacts with the outer raceway groove 5 at a point on one side of the center thereof and contacts with the inner raceway groove at a single point at the opposite side of the intersection 9, the displacement of the raceways and the slight deformation of the same thereby converting the bearing into a two-point bearing, the line of the compression strain in the ball being substantially as represented by the dotted line 10 in Fig. 2. The bearing not only acts as a two-point bearing under simple thrust loads, but also under thrust loads accompanied by radial loads, always providing that the proportion of the radial to the thrust load is not excessive. It is obvious that thrust in either direction may be sustained equally well, the bearing being entirely symmetrical. In the drawings, the displacement and deformation of the raceways as well as the difference in curvature between the raceway grooves and the ball and the eccentricity of the two curves which, together, make up the single raceway groove have been very much exaggerated for the purpose of graphically illustrating the principle of the bearing. In practice I prefer to construct my bearings as follows:

The angle "$a$" as represented on the drawings is equal to 25° 30', the radii of the arcs struck from the points 8 and representing the curvature of the two sections of the inner raceway groove are equal to .52 times the diameter of the ball. The radii struck from the point 6 and representing the curvature of the outer raceway groove are equal to .54 times the diameter of the ball.

While I have shown and described in considerable detail one specific embodiment of my invention, it is to be understood that this is illustrative only and for the purpose of making the invention more clear and that the invention is not limited to the specific construction shown and described, except in so far as such limitations are included within the terms of the accompanying claims, in which it is my intention to claim all novelty inherent in my invention as broadly as is permissible in view of the prior art.

What I claim as new and desire to secure by Letters Patent is:—

1. A ball bearing comprising inner and outer race-members provided with opposed raceway grooves, and a plurality of balls operating in said grooves, one of said raceway grooves having a transverse curvature less than the curvature of the coöperating ball whereby the ball may bear upon the same at a single point and the other raceway groove having a curved configuration producing in effect a curvature which at its central portion only is greater than that of the ball, the ball bearing upon the same at two points under a simple radial load and at one point only under a thrust load.

2. A ball bearing comprising coöperating inner and outer race-members and bearing balls traveling between the same, the outer race-member having a raceway groove of circular transverse curvature, the radius of curvature slightly exceeding that of the ball, and the raceway groove of the other race-member having a transverse curvature made up of two circular arcs each of greater radius than the ball and struck from centers laterally displaced in opposite directions from the center line of the bearing in such manner as to clear the surface of the ball in the bottom of the raceway.

OTTO A. J. R. LIPPERT-BRUENAUER.

Copies of this patent may be obtained for five cents each, by addressing the "Commissioner of Patents, Washington, D. C."